Aug. 30, 1927.
C. D. R. SCHAEFFER
SHAFT CONSTRUCTION
Filed Dec. 16, 1925
1,640,670
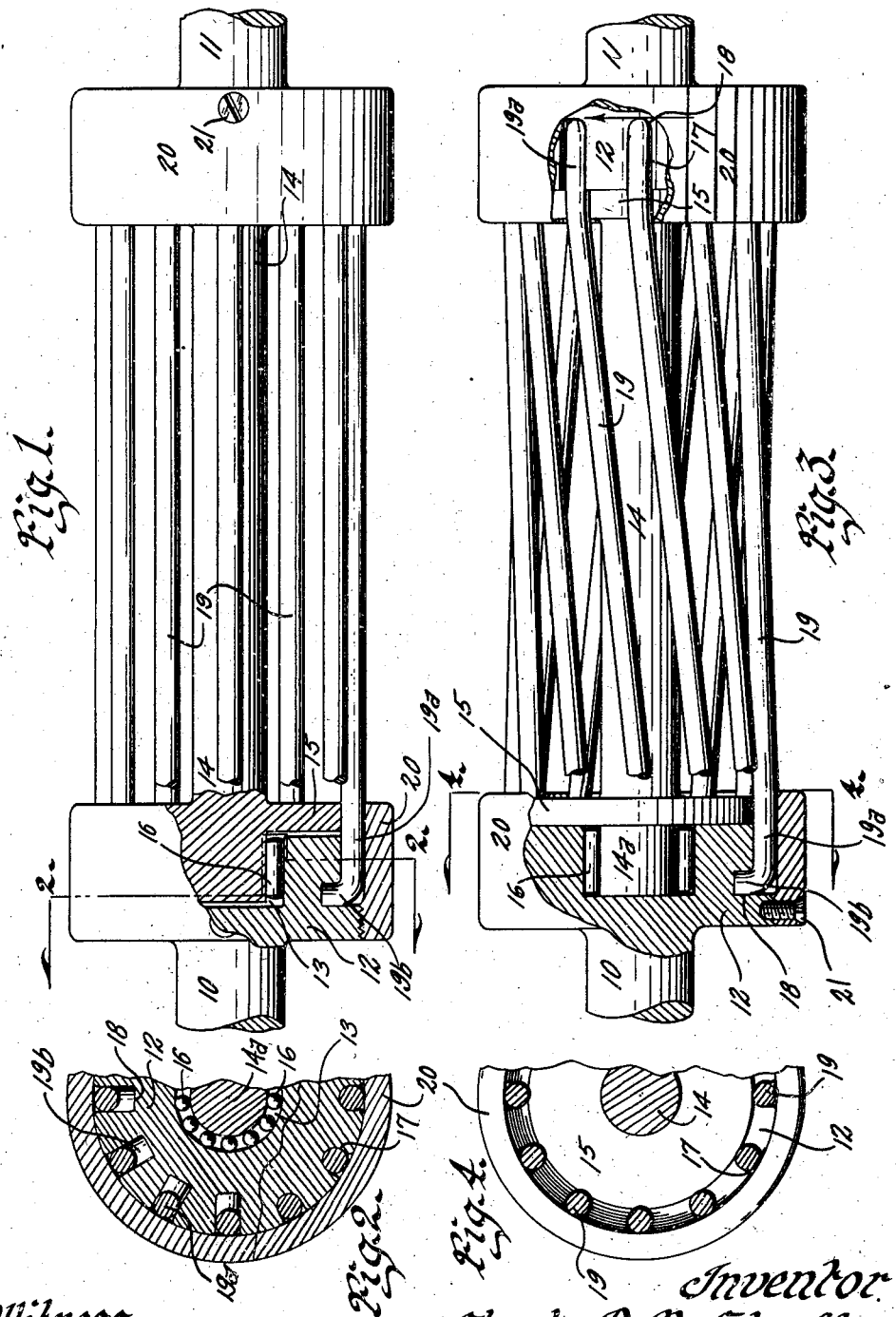
Witness
Roy Kushet
Inventor
Charles D. R. Schaeffer
by Burr & Dreeman Attorneys Patented Aug. 30, 1927.

1,640,670

UNITED STATES PATENT OFFICE.

CHARLES D. R. SCHAEFFER, OF FORT DODGE, IOWA.

SHAFT CONSTRUCTION.

Application filed December 16, 1925. Serial No. 75,779.

The object of my invention is to provide a shaft construction, whereby rotary motion transmitted by means of a shaft may be somewhat cushioned during the transmission.

More particularly, it is my object to provide a shaft construction, which can be interposed between moving parts in a motor vehicle or other piece of machinery, in such manner that varying speeds of rotation of one shaft or part of a shaft may be cushioned in the transmission to another shaft or part of a shaft, whereby the tendency of the shafts to break or twist off may be largely reduced.

Another purpose of my invention is to provide two shafts or shaft sections connected by discs and by a plurality of spaced spring rods or the like.

Still a further purpose of my invention is to provide in such a device means whereby when a certain degree of twisting movement has been given to the spring rods, the two shaft sections will be locked together, so as to prevent any further twisting.

With these and other objects in view, my invention consists in the construction, arrangement and combination of the various parts of my shaft construction, whereby the objects contemplated are attained, as hereinafter more fully set forth, pointed out in my claim, and illustrated in the accompanying drawings, in which:

Figure 1 shows a side elevation of a shaft construction embodying my invention, parts being broken away and parts being shown in section.

Figure 2 is a detail, sectional view taken on the line 2—2 of Figure 1.

Figure 3 is a side elevation of the device, parts being broken away and parts being shown in section for illustrating additional features of the invention; and Figure 4 is a detail, sectional view taken on the line 4—4 of Figure 3.

In the accompanying drawings, I have used the reference numerals 10 and 11 to indicate aligned shafts or shaft constructions.

Let it be assumed for purposes of illustration that it is desired to transmit rotary movement from the shaft 10 to the shaft 11 and to cushion such transmission in order to reduce the strain on the shafts or shaft parts.

Each of the shafts or shaft sections 10 and 11 is provided at its end with an annular disc 12, having in its end and in alignment with the shaft on which it is formed a recess or socket 13. The connecting shaft member 14 is arranged between the discs 12 on the shafts 10 and 11.

The shaft member 14 is provided near its ends with annular flanges or discs 15. The portions 14ª of the shaft member 14 projecting beyond the discs or flanges 15 are received in the recesses or sockets 13 and are journaled therein by means of roller bearings 16.

Each of the discs is provided in its peripheral face with a plurality of circumferentially spaced grooves 17, which extend parallel with the axes of the shaft and parallel to the axis of the shaft on which the disc 12 is formed.

These grooves extend from that face of the disc 12 adjacent to the flange 15 for a substantial distance and terminate in inwardly deepened recesses 18.

A plurality of spring steel rods 19 are arranged between the discs 12 of the respective shafts and have portions 19ª received in the grooves 17 and portions 19ᵇ in-turned and received in the deepened recesses 18.

The diameters of the flanges 15 are such that their peripheral faces stand within the circle of the steel rods 19, as shown for instance in Figures 1 and 2.

In order to hold the rods 19 in place in the grooves 17, a cover sleeve 20 is screwed onto each disc 12 in such manner as to overlap the portions 19ª of the rods 19, and also to overlie the peripheries of the discs or flanges 15.

Set screws 21 may be employed for holding the cover sleeves 20 against accidental displacement.

The length of the shaft 14 is such with relation to the length of the spring steel rods 19 that when the rods 19 are straight and parallel with the axis of the shaft member 14, the ends of the shaft member 14 may be slightly spaced from the bottoms of the sockets or recesses 13, and the faces of the flanges 15 may be slightly spaced from the adjacent faces of the discs 12, as clearly indicated at the left-hand end of Figure 1.

When rotation is imparted to the shaft member 10, it is obvious that its disc 12 will be rotated for carrying with it the rods 19, and thereby imparting rotation to the shaft 11 through its disc 12.

Insomuch as the rods 19 are of spring material, such imparting of rotation will tend to twist the rods 19 out of lines parallel with the extended axes of the shafts 10 and 11, and will tend to press the rods 19 into spiral lines.

The transmission of motion from the shaft 10 to the shaft 11 will thereby be somewhat cushioned.

The importance of such cushioning will, of course, be obvious.

If such a device were employed in ordinary automobiles, the strains on the differential and other gears and shafts would be reduced to a very great extent.

When the shaft member 14 is employed, it will be seen that when the twisting movement is given to the rods 19, the distance between the shafts 10 and 11 will be slightly shortened, whereupon the ends of the shaft portions 14$^a$ will bind against the bottoms of the recesses 13 and the discs or flanges 15 will bind against the discs 12 and prevent any further relative rotation of the shaft member 10 with the shaft member 11, and any further twisting of the rods 19.

This structure and operation are such as to permit the cushioning and reduction of strains in the transmission of power, while at the same time affording a very strong and studdy device not likely to be broken or torn to pieces by any strains, which would otherwise injure the mechanism, with which my device is employed.

A device of this kind will reduce the strain upon all the mechanisms to which power is applied, and is of special value to motor vehicles, where there is a great variation in speed and frequent changes in the speed of rotation transmitted from one shaft to another.

Such a structure as this reduces the strains upon all the parts including gears, shafting, wheels, and reduces the vibration on the vehicle as a whole.

Changes may be made in the structure and arrangement of my improved device without departing from the real spirit and purpose of my invention, and it is my intention to cover by my claim, any modified forms of structure or use of mechanical equivalents, which may be reasonably included within their scope.

I claim—

In a device of the class described, a pair of shafts arranged in alignment and spaced from each other, said shafts having at their adjacent ends annular discs, a plurality of spring steel rods having their ends mounted non-slidably in said discs, collars mounted on said discs for holding said rods in place, said discs having aligned sockets, a shaft section having its ends arranged in said sockets and having flanges adjacent to said discs, said shaft section being of such length as to permit limited rotary movement of said first shafts with relation to each other, whereby said rods are twisted for slightly shortening the distance between the first shafts, and being of such length as to then bind at its ends and prevent further relative rotary movement of the first shafts.

Des Moines, Iowa, December 3, 1925.

CHARLES D. R. SCHAEFFER.